(12) United States Patent
Schmidt

(10) Patent No.: US 8,371,346 B2
(45) Date of Patent: Feb. 12, 2013

(54) APPARATUS FOR CAPTURING FUEL SPILLAGE AND NOZZLE DRIP DURING REFUELING OF A VEHICLE

(76) Inventor: Robert W. Schmidt, Vero Beach, FL (US)

( * ) Notice: Subject to any disclaimer, the term of this patent is extended or adjusted under 35 U.S.C. 154(b) by 333 days.

(21) Appl. No.: 12/806,268

(22) Filed: Aug. 9, 2010

(65) Prior Publication Data
US 2012/0031508 A1   Feb. 9, 2012

(51) Int. Cl.
*B65B 1/04* (2006.01)
(52) U.S. Cl. .................. 141/350; 141/301; 220/86.2
(58) Field of Classification Search .............. 141/94, 141/95, 350; 220/86.2
See application file for complete search history.

(56) References Cited

U.S. PATENT DOCUMENTS

| | | | | |
|---|---|---|---|---|
| 4,719,949 A | * | 1/1988 | Mears | 141/301 |
| 4,809,863 A | * | 3/1989 | Woodcock et al. | 220/746 |
| 4,941,587 A | * | 7/1990 | Terada | 220/86.2 |
| 5,103,877 A | * | 4/1992 | Sherwood et al. | 141/59 |
| 5,186,220 A | * | 2/1993 | Scharrer | 141/59 |
| 5,404,906 A | * | 4/1995 | Aoshima et al. | 137/587 |
| 5,791,387 A | * | 8/1998 | Palvolgyi | 141/348 |
| 5,921,424 A | * | 7/1999 | Palvolgyi | 220/86.2 |
| 6,105,612 A | * | 8/2000 | Schaar | 137/588 |
| 6,443,195 B2 | * | 9/2002 | Palvoelgyi et al. | 141/350 |
| 6,732,759 B2 | * | 5/2004 | Romanek et al. | 137/588 |
| 6,854,491 B1 | | 2/2005 | Knight et al. | |
| 7,036,536 B1 | | 5/2006 | Knight et al. | |
| 7,063,112 B2 | | 6/2006 | Fink | |

\* cited by examiner

*Primary Examiner* — Timothy L Maust
(74) *Attorney, Agent, or Firm* — Robert Nathans

(57) ABSTRACT

A refueling nozzle is inserted into a fuel filler tube of the vehicle, refueling is carried out in the normal manner. However, during retraction of the nozzle, when the nozzle is prone to drip, a specially designed valve is caused to open and a vacuum canister draws in a rush of air and captures the dripping gas. During normal vehicle operation, the captured fuel in the vacuum canister is drawn into the engine intake manifold to be burned through the engine and the vacuum in the canister is replenished for the next refueling stop.

14 Claims, 4 Drawing Sheets

APPARATUS FOR CAPTURING FUEL SPILLAGE AND NOZZLE DRIP DURING REFUELING OF A VEHICLE

BACKGROUND OF THE INVENTION

Today's automotive vehicles are required to have an onboard refueling vapor recovery (ORVR) system to prevent the discharge into the atmosphere of gasoline (hydrocarbons) vapors that are displaced during refueling of a gasoline tank. These (ORVR) systems are somewhat complex utilizing valves and diagnostic feedback to store the hydrocarbon vapors in a charcoal canister to be later burnt through operation of the engine.

However, such (ORVR) systems known to me do not capture fuel spillage, refuel nozzle fuel dripping or fuel splash back which may represent a greater environmental threat than the aforesaid hydrocarbon vapors. Many persons readily observe such fuel drippings that fall to the ground and spillage that occurs when the refueling nozzle is returned to the gas pump.

During engine operation, the intake manifold develops a vacuum that is used to operate various systems involving heating, ventilation and air conditioning (HVAC), cruise control, and brake boost assist for vehicles with power brakes. A vacuum reserve canister is directly connected via a vacuum line to the engine manifold and is then used as the vacuum source.

BRIEF SUMMARY OF THE INVENTION

A refueling nozzle is inserted into a fuel filler tube of the vehicle, and refueling is carried out in the normal manner. However, during retraction of the nozzle, when the nozzle is prone to drip, a specially designed valve is opened and the vacuum canister draws in a rush of air that captures the dripping gas. During normal vehicle operation, the captured fuel in the vacuum canister is drawn into the engine intake manifold to be burned through the engine and the vacuum in the canister is replenished for the next refueling stop.

BRIEF DESCRIPTION OF THE DRAWINGS

Other features and advantages of the invention will become more apparent upon further reading of the specification taken in conjunction with the drawings in which.

DETAILED DESCRIPTION OF EMBODIMENTS OF THE INVENTION

Figure 1:
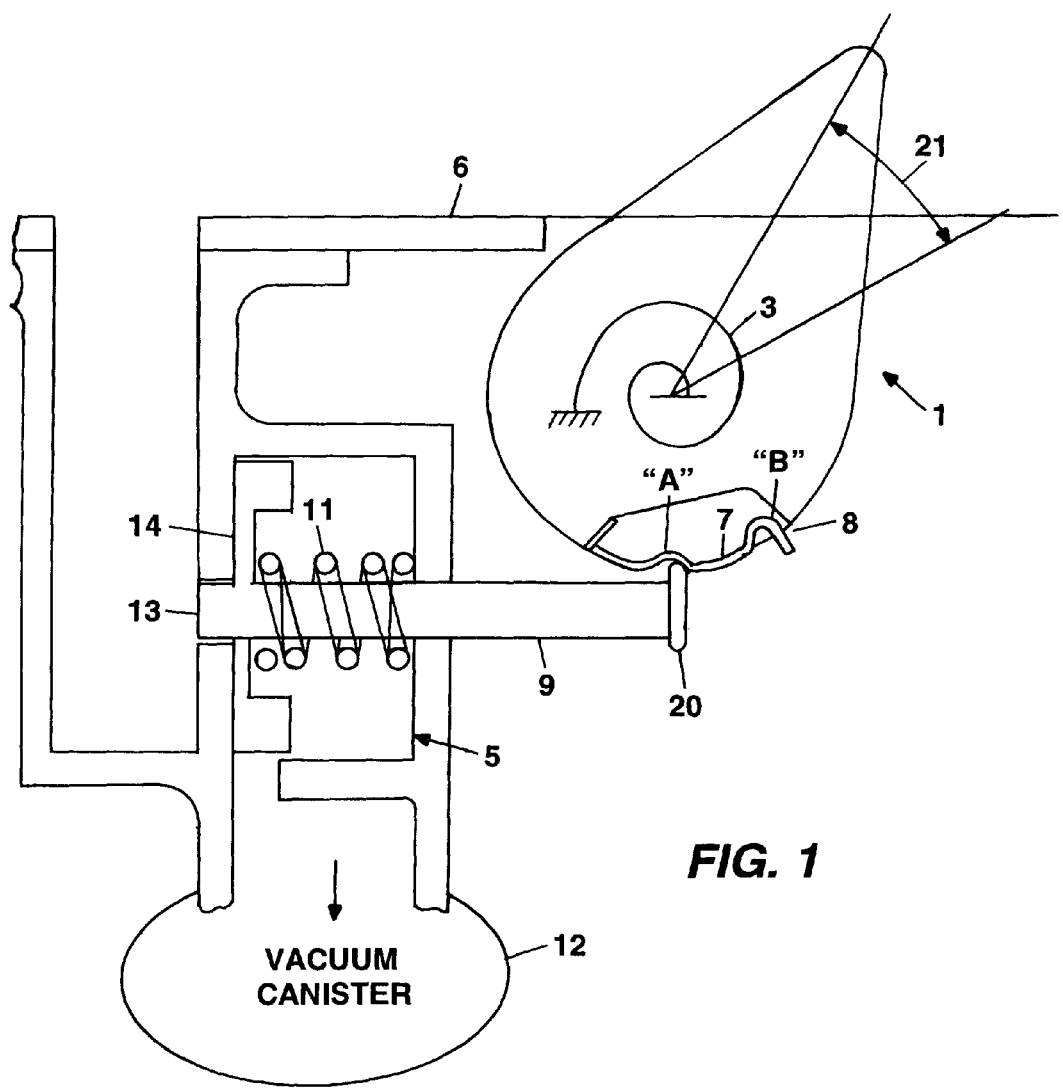
FIG. 1 discloses the special valve before the refueling nozzle is inserted into the fuel filler tube in accordance with a first embodiment of the invention.

The valve lever 1 is a short spring-loaded lever that extends partially into the fuel filler tube 6. Note coil spring 3. During refueling, as the fuel filler nozzle 4 is inserted into the fuel filler tube 6, the nozzle 4 shown in FIG. 2, pushes down upon the valve lever 1. The valve lever has a small flexible tempered steel clip 7 that is attached to the valve lever in a cantilever fashion. The clip has two small detents, "A" and "B" followed by a stop 8 at the free end.

The piston valve 5 consists of a short piston 9 held closed by a coil spring 11. The closed valve seals the vacuum canister 12 from ambient 16 psi air pressure in the filler tube 6. The face of the piston has two surface areas, a small raised circular area 13 surrounded by a larger circular area 14. The coil spring 11 is selected to have a spring constant whereby a force greater than 16 psi pressure on the smaller circular piston area 13 is needed to open the valve, and yet pressure less than 16 psi pressure on the large circular area 14 can open it since the far lesser pressure upon the large area produces an enhanced force sufficient to open the valve. In this manner, the coil spring holds the piston shut when only the small area is exposed to ambient air in the filler tube.

Figure 3:
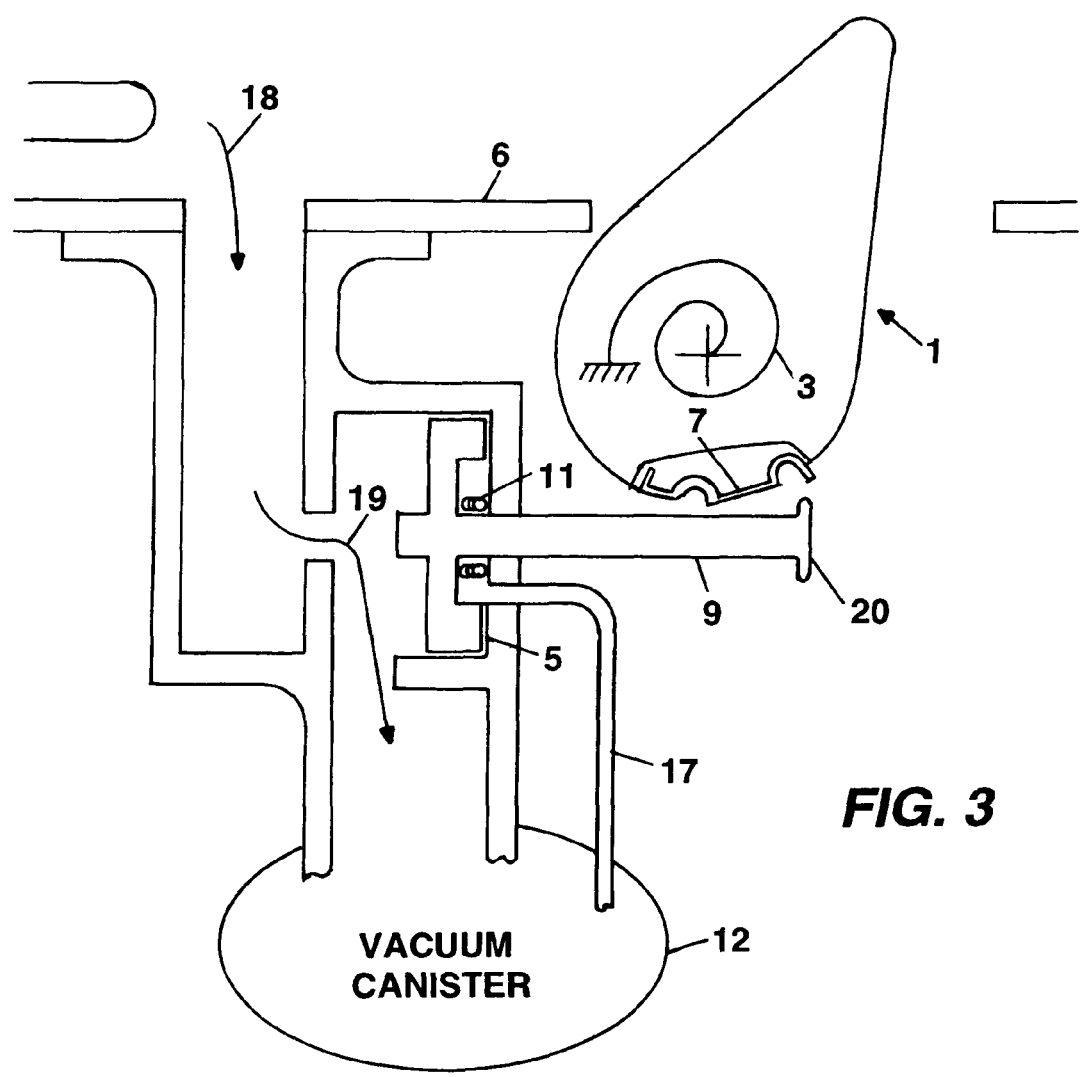
FIG. 3 discloses the special valve upon withdrawal of the refueling nozzle from the fuel filler tube.

However if the piston 9 is moved slightly to the right, exposing the larger piston face area 14 to the 16 psi pressure in the fill tube, the resulting force, being greater than the resisting spring force, will push the piston completely open as shown in FIG. 3. The intake manifold of the vehicle is capable of creating a vacuum pressure in the canister 12 of between 8 to 10 psi, therefore the true pressure difference of 16 psi-10 psi would determine the necessary spring force constant to permit pressure on the larger area 14 to overcome the spring resistive force of spring 11 to enable opening of the valve.

Figure 2:
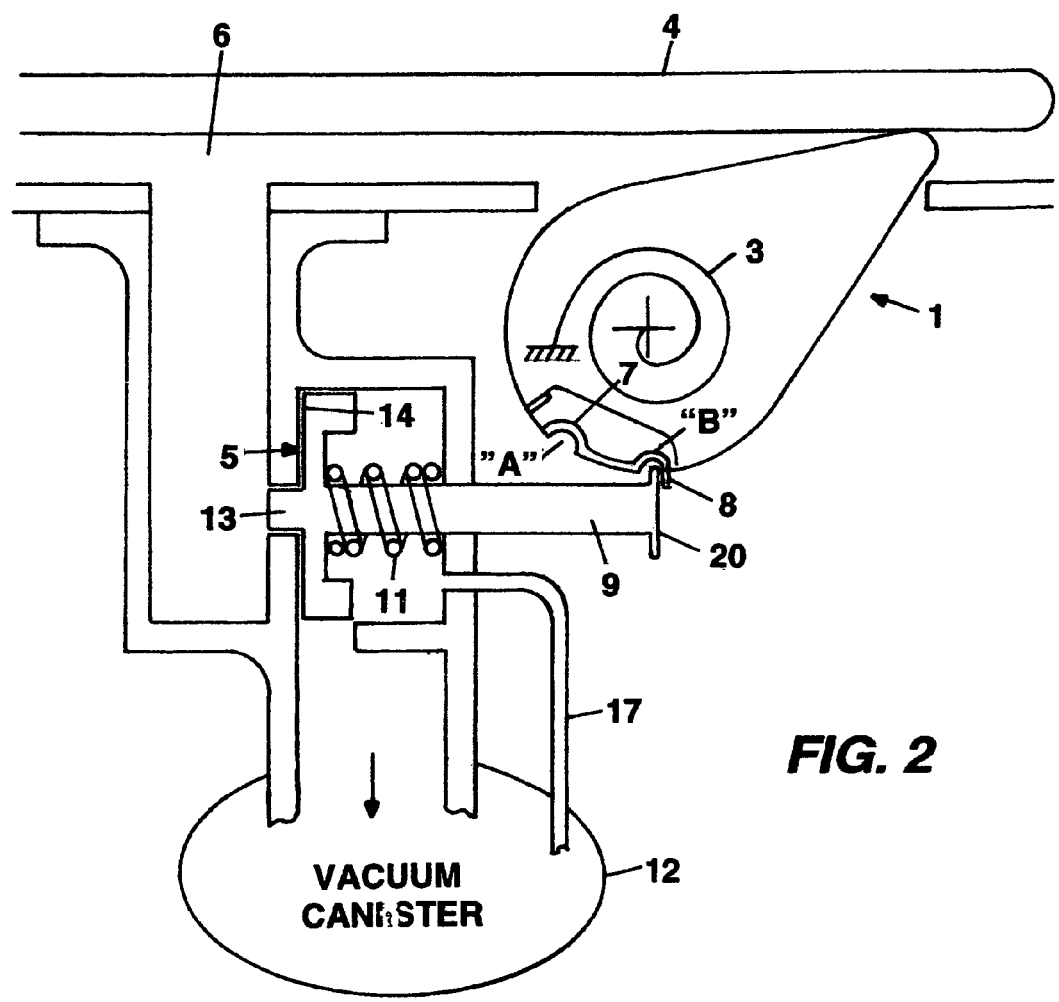
FIG. 2 discloses the special valve during the refueling.

Because the piston valve 5 might be susceptible to premature opening due to disturbance from vibrations or inertia of vehicle motion, the tempered clip 7 of the valve lever has a detent "A" that catches a tab 16 at the end of the piston to hold the valve shut as shown in FIG. 1. When refueling, the inserted fuel filler nozzle 4 rotates the valve lever 1 downwardly. As the tempered steel clip rotates clockwise, the tab end 20 of the piston slips out of the detent "A" and is captured by the detent "B" as shown in FIG. 2, and the piston valve 5 is held closed by the stop at the end of the tempered clip.

After refueling, when the nozzle is retracted from the fill tube, the spring loaded lever returns to the original position (FIG. 1) and detent "B" pushes the tab 20 the end of the piston valve slightly to the right, just enough to move the piston to expose its larger circular area 14 to ambient 16 psi air in the filler tube 6, thereby to drive the piston valve completely open. The valve now being open, the vacuum canister 12 draws in both vapor and fuel drip from the nozzle as the nozzle 4 is extracted from the fuel filler tube 6 as shown by arrows 18 and 19 shown in FIG. 3.

Once the air pressure is equalized across the piston face, the compressed coil spring 11, shown in FIG. 3, returns the piston valve to the closed position shown in FIG. 1 and the tab end engages detent "A" as shown in FIG. 1 securing the piston valve closed. A small return line 17, from the vacuum canister to the back of the piston aids in pressure equalization as shown in FIGS. 2 and 3. Arrow 21 in FIG. 1 indicates motion between the two positions of the valve lever.

Figure 4:
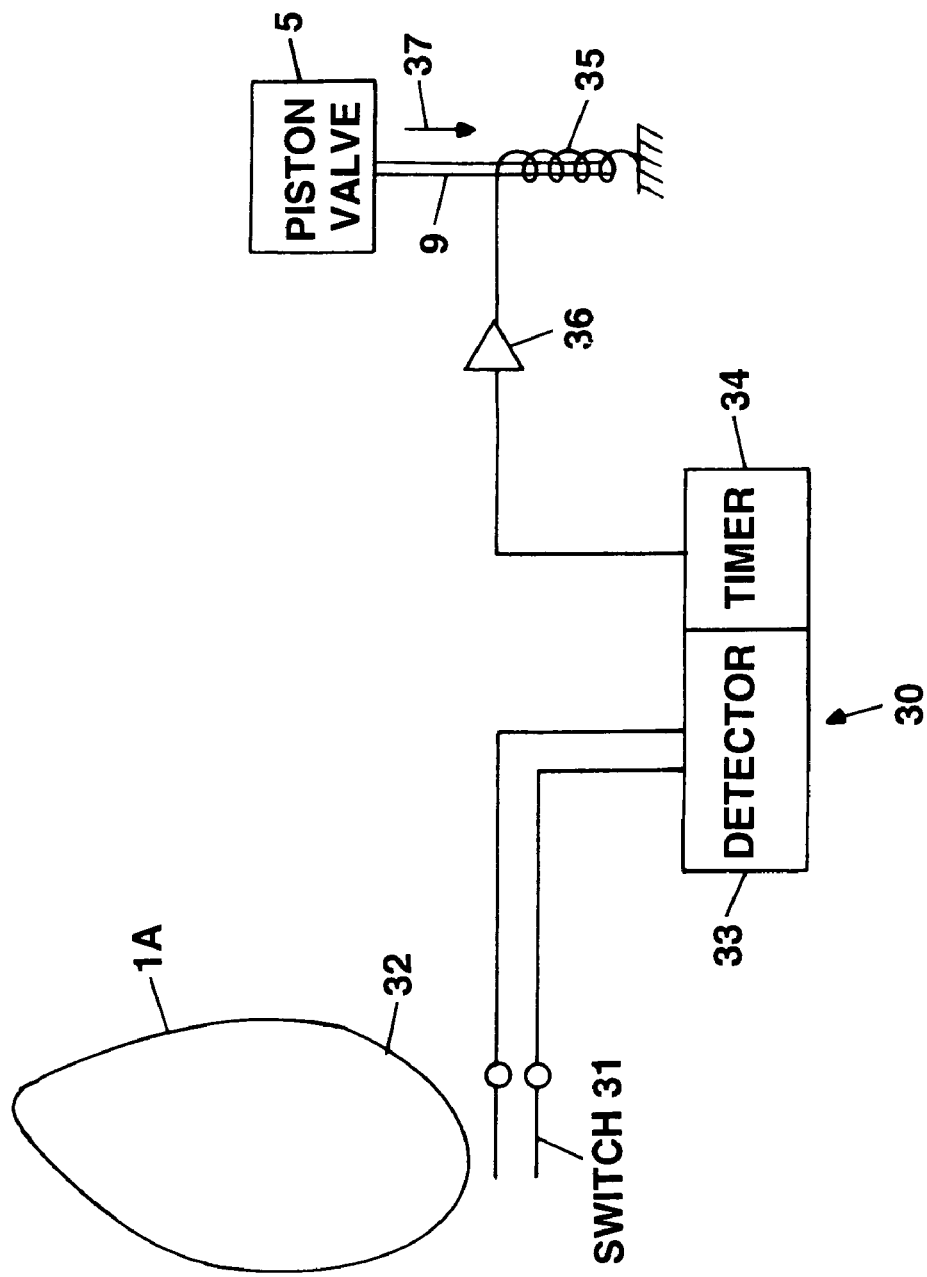
FIG. 4 discloses a second embodiment of the invention.

A second embodiment of the invention is shown in FIG. 4, whereby a spring-loaded valve lever 1A, similar to the valve lever 1 described above, would operate in a similar manner when the fuel nozzle is inserted. The valve lever 1A has a cam surface 32 that closes a switch 31 when rotated upon insertion of the refueling nozzle into the fuel filler tube. A simple logic circuit 30 is utilized that recognizes the release and the reopening of the switch 31 when the fuel nozzle is removed from the fuel filler tube. The logic circuit 30 then activates a solenoid 35 that opens the piston valve 5 with its electromagnet and holds the valve open for a preprogrammed time of several seconds such as five seconds. After the time interval passes, the valve is released and the vacuum canister valve closes. Thus, the opening of the piston valve 5 for a preprogrammed time interval enables the vacuum canister 12 to draw in both vapor and fuel drip from the nozzle as the nozzle 4 is extracted from the fuel filler tube 6 as shown by arrows 18 and 19 in FIG. 3.

More specifically, logic circuit 30, coupled to switch 31, could include a "closed switch-to-open" electrical pulse detector 33, such as a flip flop, that triggers timer section 34 for the aforesaid preprogrammed time period during which solenoid 35 keeps piston valve 5 open. A mono-stable multi-vibrator might be employed as logic circuit 30. An amplifier 36 may be employed to actuate the solenoid to cause the solenoid plunger, coupled to the piston valve, to travel in the direction of arrow 37.

Thus it should now be understood that
a preferred device is provided, coupled between the spring loaded valve lever 1 and the spring loaded piston valve 5, for causing the larger circular area 14 of the piston valve to become exposed to pressure in the fuel filler tube 6 in response to actuation of spring loaded valve lever from the second position back to the first position caused by withdrawal of the refueling nozzle 4 from the fuel filler tube in order to suck fuel drippings and fuel vapors from the fuel filler tube and into the vacuum canister 12 and;

in accordance with a first embodiment of the invention, the device includes a resilient cantilever member 7 coupled between the spring loaded valve lever and the piston valve for enabling the large area of the piston 14 to be exposed to ambient pressure within the fuel filler tube upon displacement of the spring loaded valve lever from said second position back to the first position;

and in accordance with a second embodiment of the invention, a solenoid 35 (FIG. 4) is provided for opening the piston valve upon the actuation of the solenoid; and a logic circuit 30 is coupled between the cam operated switch 31 and the solenoid for actuating the solenoid upon the movement of the switch from the second position back to the first switch position upon removal of said refueling nozzle from said fuel filler tube and;

wherein the logic circuit includes a timing device 34 for actuating the solenoid for a given time period for in turn opening the spring loaded piston valve for a given time period.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

I claim:

1. Apparatus for capturing fuel drip and for reducing fuel spillage and splash-back loss during refueling of a fuel storage tank of an engine by insertion of a refueling nozzle into a fuel filler tube, said apparatus having
   (a) a switch mechanically biased to extend into the fuel filler tube when assuming a first switch position but which is displaced from the first switch position into a second switch position by the refueling nozzle being inserted into the fuel filler tube;
   (b) a vacuum reservoir canister configured to be evacuated by operation of the engine;
   (c) a spring loaded piston valve held normally closed by a spring member, said piston valve being in gaseous communication between said fuel filler tube and said vacuum reservoir canister when said spring loaded piston valve is opened;
   (d) a solenoid for opening said piston valve upon the actuation of the solenoid;
   (e) a logic circuit coupled between said switch and said solenoid for actuating the solenoid upon the movement of said switch from the second position back to said first switch position upon removal of said refueling nozzle from said fuel filler tube.

2. The apparatus of claim 1 wherein said spring loaded piston valve has a small circular area normally exposed to ambient pressure within said fuel filler tube and a large circular area normally unexposed to the ambient pressure within said fuel filler tube.

3. The apparatus of claim 1 wherein said logic circuit includes a timing device for actuating said solenoid for a given time period for in turn opening said spring loaded piston valve for a given time period.

4. The apparatus of claim 3 wherein said given time period has a duration of several seconds.

5. The apparatus of claim 2 wherein said logic circuit includes a timing device for actuating said solenoid for a given time period for in turn opening said spring loaded piston valve for a given time period.

6. The apparatus of claim 5 wherein said given time period has a duration of several seconds.

7. Apparatus for capturing fuel drip and for reducing fuel spillage and splash-back loss during refueling of a fuel storage tank of an engine by insertion of a refueling nozzle into a fuel filler tube, said apparatus having
   (a) a spring loaded valve lever normally extending into the fuel filler tube when assuming a first position but which is displaced from the first position into a second position by the refueling nozzle being inserted into the fuel filler tube;
   (b) a vacuum reservoir canister configured to be evacuated by operation of the engine;
   (b) a spring loaded piston valve held normally closed by a spring member, said piston valve being in gaseous communication between said fuel filler tube and said vacuum canister when said spring loaded piston valve is open;
   (c) said piston valve having a small circular area normally exposed to ambient pressure within said fuel filler tube and a large circular area normally unexposed to said ambient pressure within said fuel filler tube;
   (d) a device coupled between said spring loaded valve lever and said spring loaded piston valve for causing the larger circular area of said piston valve to become exposed to pressure in the fuel filler tube in response to actuation of said spring loaded valve lever from said second position back to said first position caused by withdrawal of the refueling nozzle from the fuel filler tube in order to suck fuel drippings and fuel vapors from the fuel filler tube and into the vacuum canister;
   (e) and wherein said device includes a resilient cantilever member coupled between the spring loaded valve lever and the piston valve for enabling the large area of the piston to be exposed to ambient pressure within the fuel filler tube upon displacement of said spring loaded valve lever from said second position back to said first position; and
   (f) wherein said spring loaded piston valve has a piston which contacts the cantilever member keeping the spring loaded valve closed except when the spring loaded valve member travels from said second position back to said first position, thereby enabling the spring loaded valve member to open.

8. The apparatus of claim 7 wherein the cantilever member has detents therein that receive a tab member upon the piston valve for preventing the large area of the spring loaded piston valve to be exposed to the ambient pressure in the fuel filler tube except when the valve lever changes position between the second position back to the first position.

9. Apparatus for capturing fuel drip and for reducing fuel spillage and splash-back loss during refueling of a fuel storage tank of an engine by insertion of a refueling nozzle into a fuel filler tube, said apparatus having
(a) a fuel nozzle sensor for assuming a first state but which changes from the first state into a second state by the refueling nozzle being inserted into the fuel filler tube;
(b) a vacuum reservoir canister configured to be evacuated by operation of the engine;
(b) a spring loaded piston valve held normally closed by a spring member, said piston valve being in gaseous communication between said fuel filler tube and said vacuum canister when opened; and
(c) a mechanism coupled between said fuel nozzle sensor and said spring loaded piston valve for opening said spring loaded piston valve upon a change of state of said sensor from the second state back to said first state upon removal of said refueling nozzle from said fuel filler tube;
(d) a solenoid for opening said piston valve upon the actuation of the solenoid; and
(e) a logic circuit coupled between said fuel nozzle sensor and said solenoid for actuating the solenoid upon the change of state of said fuel nozzle sensor from the second state back to said first state upon removal of said refueling nozzle from said fuel filler tube.

10. The apparatus of claim 9 wherein said piston valve has a small circular area normally exposed to ambient pressure within said fuel filler tube and a large circular area normally unexposed to ambient pressure within said fuel filler tube; and wherein said mechanism is configured for causing the larger circular area of said piston valve to become exposed to ambient pressure in the fuel filler tube in response to change of state from said second state back to said first position caused by withdrawal of the refueling nozzle from the fuel filler tube.

11. The apparatus of claim 9 wherein said logic circuit includes a timing device for actuating said solenoid for a given time period for in turn opening said spring loaded piston valve for a given time period.

12. The apparatus of claim 10 wherein said logic circuit includes a timing device for actuating said solenoid for a given time period for in turn opening said spring loaded piston valve for a given time period.

13. The apparatus of claim 11 wherein said given time period has a duration of several seconds.

14. The apparatus of claim 12 wherein said given time period has a duration of several seconds.

\* \* \* \* \*